May 11, 1954     H. J. MURPHY     2,678,075
NUT RETAINING DEVICE
Filed Aug. 23, 1950
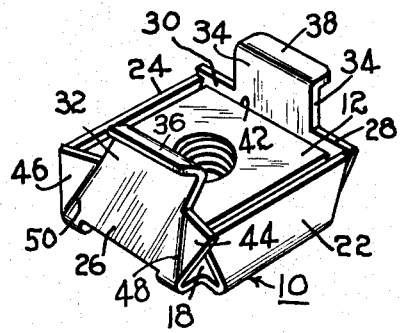
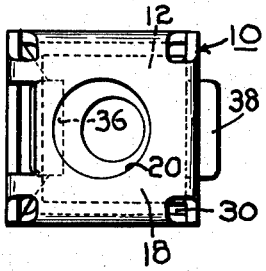
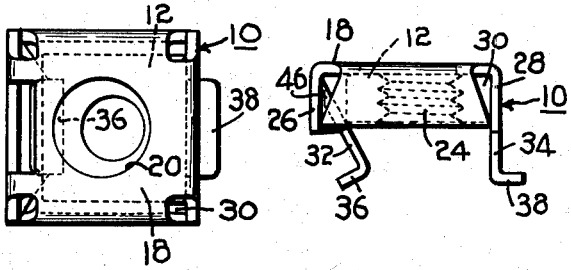
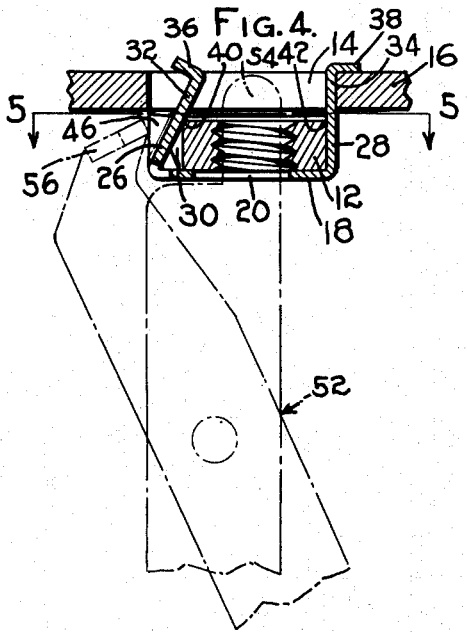
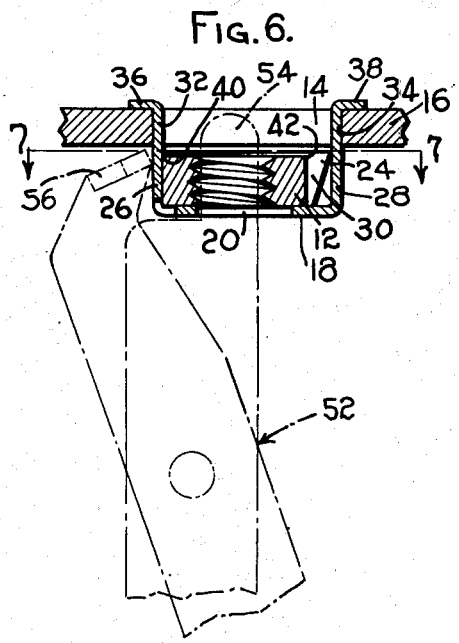
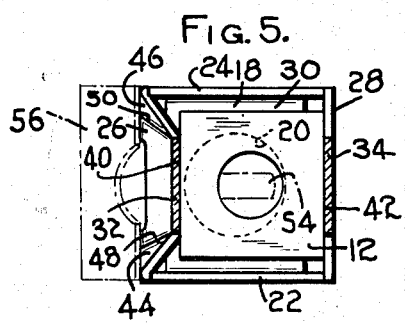
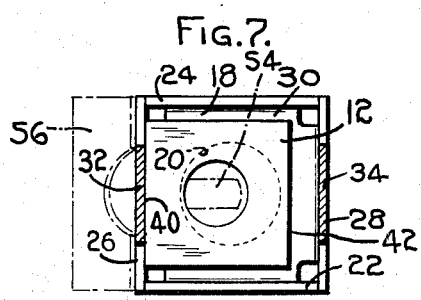
INVENTOR:
HOWARD J. MURPHY,
BY *Robert E Ross*
AGENT.

Patented May 11, 1954

2,678,075

UNITED STATES PATENT OFFICE 2,678,075

NUT RETAINING DEVICE

Howard J. Murphy, Lynnfield, Mass., assignor to United-Carr Fastener Corporation, Cambridge, Mass., a corporation of Massachusetts Application August 23, 1950, Serial No. 181,014

2 Claims. (Cl. 151—41.74)

1

This invention relates generally to fastening devices, and has particular reference to a fastener retaining device to contain a fastener such as a nut member for attachment to a supporting panel.

The object of the invention is to provide a fastener retaining device having a pair of panel-engaging members which have means for deformation by lateral movement of a fastener in the retaining device to increase the distance between the panel-engaging members.

A further object of the invention is to provide a fastener-retaining device having a pair of panel-engaging members, in which one panel-engaging member is provided with a portion extending into the fastener-receiving space which is adapted to be deformed outwardly by movement of the fastener in the space to increase the distance between said panel-engaging members.

A still further object of the invention is to provide a fastener-receiving cage as above described in which the deformable panel-engaging member initially extends over a portion of the fastener to retain it in assembly with the cage prior to assembly of the cage with the supporting panel.

Other objects of the invention will, in part, be obvious, and will, in part, appear hereinafter.

In the drawing:

Fig. 1 is a perspective view of a fastener-retaining device embodying the features of the invention;

Fig. 2 is a top plan view of the device of Fig. 1;

Fig. 3 is a view in side elevation of the device of Fig. 1;

Fig. 4 is a view in elevation, partly in section, of the device of Fig. 1, illustrating the first step in assembly of the device into a supporting panel opening;

Fig. 5 is a view in section taken on line 5—5 of Fig. 4;

Fig. 6 is a view similar to Fig. 4, illustrating the second step in assembly of the device;

Fig. 7 is a view in section taken on line 7—7 of Fig. 6.

Referring to the drawing, there is illustrated a fastener-retaining device 10, which is adapted to contain a fastener such as a nut 12 and be assembled into an opening 14 in a supporting panel 16.

The device 10 is preferably formed of a single piece of deformable metal, and comprises generally a base 18 having a central opening 20, a pair of side walls 22 and 24 and a pair of end walls 26 and 28, which extend from the edges of the base to form a fastener-receiving space 30. The end walls 26 and 28 are each provided with

2 an extended portion 32 and 34 respectively, having panel-engaging feet 36 and 38 extending outwardly from the ends thereof in opposite directions. The end wall 26 is inclined inwardly relative to the base into the space 30, and when the nut 12 is disposed in the space 30, the extended portion 32 of the wall 26 overhangs the adjacent edge 40 of the nut to retain the nut in assembly in the space 30, and the thickness of the nut prevents the opposite edge 42 from moving upwardly far enough to allow the nut to fall out of the space 30. The end wall 26 is also provided with a pair of deformable wings 44 and 46 which are joined to the sides of the wall 26 at bent lines 48 and 50 to extend laterally therefrom and the wings are inclined outwardly beyond the adjacent ends of the side walls 22 and 24, for a purpose to be hereinafter described.

The method of assembly of the fastener-retaining device with the supporting panel is best illustrated by reference to Figs. 4–7. The device is most conveniently assembled by means of a tool 52, having a pair of gripping elements which comprises a stud member 54 adapted to enter the opening 20 in the base and the opening in the nut, and a jaw 56 which is adapted to bear against the wings 44 and 46. A retaining device containing a nut is first assembled onto the tool 52 in the position illustrated in Fig. 4, and the feet 36 and 38, which are originally spaced apart a distance less than the width of the opening 14 in the panel, are inserted into the opening so that the lower edges of the side walls and end walls bear against the outer surface of the panel and the foot 38 is disposed behind the panel at one edge of the opening. (See Fig. 4.) The gripping elements of the tool are then squeezed together, so that the stud 54 forces the nut 12 to move laterally relative to the base toward the inclined end wall 26. The end wall 26 and the wings 44 and 46 are thus pressed between the nut and the jaw 56, and further pressure from the tool flattens the wings on the bend lines 48 and 50 and also bends the inclined wall 26 outwardly as illustrated in Fig. 6, so that the foot 36 passes behind the adjacent edge of the panel (see Fig. 6). Since the device is preferably made of a metal capable of permanent deformation, there will be a minimum of spring-back in the end wall 26, so that the foot 36 will retain behind the adjacent edge of the panel to retain the device in assembly in the opening. A cooperating fastening device such as a bolt (not shown) may then be assembled into the nut from either side of the panel, to secure an article thereto.

Although in the illustrated embodiment the nut is substantially square, it will be understood that nuts having other shapes may be used provided the shape of the retaining device is modified to prevent rotation of the nut therein during assembly of a bolt into the nut. Types of fastening devices other than nuts may also be used in the retaining device to suit requirements of individual cases.

Since certain other obvious changes may be made in the device without departing from the scope of the invention, it is intended that all matter contained herein be interpreted in an illustrative and not in a limiting sense.

I claim:

1. A fastening device for assembly into an opening in a supporting panel, said device comprising a nut member and a retaining member formed from a piece of sheet metal bent to provide a base overlying one face of said nut member, opposed side walls extending substantially perpendicularly from opposite side edges of said base to embrace loosely opposite side edge faces of said nut member and terminating in end edges disposed substantially parallel to said base, and opposed end walls extending from opposite end edges of said base to embrace loosely opposite end edge faces of said nut member and terminating in outwardly directed hook portions at substantially equal distances from the respective end edges of said base, one of said end walls being substantially perpendicular to said base and the other extending angularly inwardly to overlie the opposite face of said nut member to secure said nut member in assembly with said retainer member, said side wall having side edges extending substantially perpendicular to said base portion at the edge thereof from which extends said other end wall, said other end wall having wing portions extending laterally from the opposite side edges thereof, and angularly outwardly from the plane of said other end wall, to beyond said side edges of said side walls, whereby upon the insertion of the terminal ends of the end walls into an aperture in a supporting panel and the application of squeeze pressure between the nut member and the extremities of the wing portions of said other end wall, said other end wall is caused to be bent to a perpendicular relationship with respect to said base and the wings are permanently deformed to lie substantially in the plane of said other end wall so as to engage the hook portions behind the supporting panel thereby attaching the device thereto.

2. A nut retaining device for securing a nut member to a supporting panel in a loosely aligned relationship to an aperture in the panel, said retaining device being formed from a piece of sheet metal bent to provide a base portion for overlying one face of a nut member, opposed side walls extending substantially perpendicularly from opposite side edges of said base for loosely embracing opposite side edge faces of such a nut member and terminating in end edges disposed substantially parallel to said base portion, and opposed end walls extending from opposite end edges of said base for loosely embracing opposite end edge faces of such a nut member and terminating in outwardly directed hook portions at substantially equal distances from the respective end edges of said base portion, one of said end walls being substantially perpendicular to said base portion and the other end wall extending angularly inwardly for overlying an opposite face of such nut member to secure such nut member in assembly with the retainer member, said side walls having side edges extending substantially perpendicular to said base portion at the edge thereof from which extends said other end wall, said other end wall having wing portions extending laterally from the opposite side edges thereof, and angularly outwardly from the plane of said other end wall, to beyond said side edges of said side walls, whereby upon the assembly of the retainer member with a nut member, the insertion of the terminal ends of the end walls into an aperture in a supporting panel and the application of squeeze pressure between the nut member and the wings of the other end wall, said other end wall is caused to be bent into perpendicular relationship with respect to the base portion and the wings are permanently deformed to lie substantially in the plane of said other end wall, so as to engage the hook portions behind such a supporting panel and thereby secure the retainer and a nut member encaged within to a supporting panel with the nut member in loose alignment with the aperture through such supporting panel.

References Cited in the file of this patent

UNITED STATES PATENTS

| Number | Name | Date |
|---|---|---|
| 1,800,176 | Carr | Apr. 7, 1931 |
| 2,079,917 | Mitchell | May 11, 1937 |
| 2,079,918 | Mitchell | May 11, 1937 |
| 2,218,823 | Kengel | Oct. 22, 1940 |
| 2,244,823 | Burke | June 10, 1941 |
| 2,495,037 | Tinnerman | Jan. 17, 1950 |